United States Patent
Ambs et al.

(10) Patent No.: US 6,693,848 B1
(45) Date of Patent: Feb. 17, 2004

(54) APPARATUS FOR MICROCHIP LASER GEO-SENSORS

(75) Inventors: Loran Ambs, Fulshear, TX (US); Chris Yakymyshyn, Bozeman, MT (US)

(73) Assignee: WesternGeco, L.L.C., Houston, TX (US)

( * ) Notice: Subject to any disclaimer, the term of this patent is extended or adjusted under 35 U.S.C. 154(b) by 0 days.

(21) Appl. No.: 09/590,907

(22) Filed: Jun. 9, 2000

(51) Int. Cl.$^7$ ............................ H04R 23/00; G01V 1/16
(52) U.S. Cl. ........................................ 367/149; 73/655
(58) Field of Search ................................. 367/149, 150, 367/151; 73/655, 657; 356/28.5

(56) References Cited

U.S. PATENT DOCUMENTS

| | | | |
|---|---|---|---|
| 3,808,557 A | 4/1974 | Smiley | 332/7.51 |
| 4,286,838 A | 9/1981 | Huignard et al. | 350/96.11 |
| 4,546,458 A | 10/1985 | Cielo et al. | 367/149 |
| 5,070,483 A | 12/1991 | Berni | 367/14 |
| 5,109,362 A | 4/1992 | Berni | 367/14 |
| 5,317,383 A | 5/1994 | Berni | 356/351 |
| 5,327,216 A | 7/1994 | Berni | 356/351 |
| 5,353,262 A | 10/1994 | Yakymyshyn et al. | 367/149 |
| 5,365,539 A * | 11/1994 | Mooradian | 372/75 |
| 5,532,981 A | 7/1996 | Duggal et al. | 367/149 |
| 5,564,832 A | 10/1996 | Ball et al. | 374/161 |
| 5,590,090 A | 12/1996 | Duggal et al. | 367/7 |
| 5,602,800 A | 2/1997 | Duggal | 367/149 |
| 5,636,181 A | 6/1997 | Duggal | 367/149 |
| 5,732,046 A * | 3/1998 | O'Donnell et al. | 367/149 |

FOREIGN PATENT DOCUMENTS

DE  4322291  1/1995

OTHER PUBLICATIONS

"The Ideal Light Source for Datanets", Author Kirk S. Giboney, Lewis B. Aronson and Brian E. Lemoff, Publication: IEEE Spectrum, Feb. 1998, pp. 43–53.

Holzapfel, Neuschaefer–Rube and Kobusch., "High–Resolution, Very Broadband Force Measurements by Solid State Laser Transducers", Journal Measurements — vol. 28, pp. 277–291.

Wolfgang Holzapfel and Martin Finneanann, "High–Resolution Sensing by a Diode–Pumped Nd:Yag Laser", Optics Letters —vol. 18, No. 23, Dec. 1, 1993, pp. 2062–2064.

Optical Detection of Ultrasound with a Microchip Laser, XP 000443172, A. R. Duggal, C. P. Yakymyshyn, D. F. Fobare and D. C. Hurley, 2414 Optics Letters 19 (1994) May 15, No. 10, Washington, US, pp. 755–757.

* cited by examiner

*Primary Examiner*—Ian J. Lobo
(74) *Attorney, Agent, or Firm*—David S. Figatner; Madan, Mossman & Sriram

(57) ABSTRACT

An optical geophone or hydrophone for detecting seismic vibrational energy comprising a laser material, which generates a lasing frequency signal, the frequency of which varies in accordance with vibrational energy incident upon the laser material, a light source occurring at an excitation frequency for providing excitation energy incident upon the laser material, so that the laser material emits light at the lasing frequency modulated by the vibrational energy and a fiber optic cable for transmitting the excitation frequency light to the laser material and receiving the frequency modulated lasing frequency for transmission to a receiver. The laser material comprises a first face and a second face, the first face being parallel to the second face. The first face is coated so that it passes substantially all of the lasing frequency light and reflects substantially all of the excitation frequency light. The second face is coated so that the second face reflects substantially all of the lasing frequency light and substantially all of the excitation frequency light. An acoustic amplifier is provided for coupling vibrational energy to the laser material, wherein the vibrational energy is incident upon a side of the laser material orthogonal or parallel to the incidence of the excitation energy.

28 Claims, 1 Drawing Sheet

APPARATUS FOR MICROCHIP LASER GEO-SENSORS

BACKGROUND OF THE INVENTION

1. Field of the Invention

This invention relates to laser sensors for measuring faint vibrations or pressure waves at low frequencies on land or at sea.

2. Related Art

Microchip lasers have been used in vibration detection in ultrasound U.S. Pat. No. 5,353,262 entitl ed "Optical Transducer and Method of Use" by Yakymyshyn, et al. discloses an optical transducer, for an ultrasound system, which includes a signal laser that generates an optical signal the frequency of which varies in correspondence with acoustic energy incident on the transducer. An optical cavity in the signal laser is disposed such that incident acoustic energy causes compression and rarefaction of the optical cavity, and this displacement varies the optical frequency generated by the laser. A laser pump coupled to the lasing medium is adapted to apply selected levels of excitation energy appropriate to the generation and detection of acoustic pulses. The signal laser alternatively is adapted such that the refractive index of the optical cavity is varied in correspondence with the incident acoustic energy to modulate the optical frequency of the light generated by the signal laser. A piezoelectric device is disposed to receive the incident acoustic energy and generate a corresponding electrical signal that is applied to an electro-optic cell in the optical cavity, or alternatively, to conductors to generate an electric field across the lasing medium.

U.S. Pat. No. 5,602,800 entitled "Methods for Ultrasonic/Vibration Detection Using Polarization Beating In A Microchip Laser" and U.S. Pat. No. 5,636,181 entitled "Ultrasonic/Vibration Detection Using Polarization Beating In A Microchip Laser" by Duggal disclose methods for ultrasonic/vibration detection include using a sensor consisting of a microchip laser or an array of microchip lasers constructed to oscillate at two different laser frequencies corresponding to two orthogonal polarizations is disclosed. The frequency difference between these two different frequencies is chosen to occur at frequencies within the bandwidth of an electrical (as opposed to optical) signal processing system. When the microchip laser or microchip laser array is placed in an acoustic field, its cavity length is modulated, which causes a frequency modulation of the frequency difference between the two modes. When the two laser output polarizations are mixed using a polarization scrambling device, such as a polarizer at about 45 degrees to the polarization axes and then detected with a photodiode, one for each microchip laser, the resulting electrical signal contains the FM modulated beat frequency between the two polarization modes. This beat frequency is then demodulated using an electrical signal processing system.

Sensors for these two laser sensor applications have traditionally used piezoelectric transducers or linear induction transducers to generate a voltage or current that is proportional to a pressure, velocity or acceleration at a particular location. The U.S. Navy recently deployed optical fiber interferometric sensors, which give excellent sensitivity at multiple sensor locations along a single, light-weight electromagnetic interference immune fiber cable. Military applications, however, have the luxury of demanding the highest performance with concomitant high system costs. While several companies are exploring the use of optical fiber sensor technologies such as Bragg gratings for downhole oil and gas sensor applications, the cost and sensitivity of such systems may preclude their ability to displace the highly cost-effective linear induction sensors used today.

The following is an example of an existing geophone sensor (e.g. the Mark 2 produced by Mark Products, Houston, Tex.) which has the following properties:

| | |
|---|---|
| Moving mass | 8.4 gms |
| Frequency range | 20 Hz–250 Hz |
| Distortion | 0.02% |
| Sensitivity | 1.5 micro-g (assuming 10 Hz and 12 μV data acquisition system noise) |
| Dynamic range | 100 dB typical |
| Data Acquisition System cost/channel | $500–$750 |

Hydrophones have similar specifications with sensitivity of 0.1 Pa. These specifications represent a formidable challenge for optical sensors. In addition to these steady-state requirements, the sensors must function while tilted in the Earth's gravitational field (which is sizable compared with the accelerations being detected), and the system must work over a wide range of temperatures.

Based on these requirements, optical sensor designers have avoided using active optical devices at the sensor pod, due among other things to the challenging design problems presented when temperature cycling the sensor pod. Bragg gratings have been a preferred approach by many investigators over the last five years. The Bragg grating is formed inside of an optical fiber. The fiber is stressed, which causes a shift in the optical frequency, which is reflected back from the grating. Such sensors can also measure strain and temperature. The long-term stability of Bragg gratings is still being explored, but has shown good performance up to 100° C. operating temperatures. Thus there is a need for a microchip laser that overcomes the limitations of the known prior systems discussed above.

Prior art passive optical sensors for seismic and underwater applications have relied on intensity modulation of an optical carrier. In normal operation, the optical intensity, detected by the receiver electronics varies as the fiber is thermally cycled or mechanically perturbed. This spurious signal can be mistaken as a signal originating from the sensor element. This is a disadvantage of intensity modulated designs. For phase modulated systems, the phase difference between two optical carriers is measured. In prior art designs, the phase difference between the two carriers is modulated by the sensor element. Spurious signals imparted along the cabling modulate the phase and amplitude of both carriers. If this common mode modulation is identical for both carriers, then the differential phase modulation is immune to the spurious signals (the common mode rejection is high). In practice, common mode phase and amplitude modulation is difficult to achieve, and as a result a high common mode rejection at the receiver electronics is difficult to achieve.

SUMMARY OF THE INVENTION

The common mode rejection of a phase-modulated sensor system can be improved by increasing the phase modulation depth imparted by the sensor element. For time-varying signals and large phase modulation depths, this is equivalent to frequency modulation. In this case, the frequency modulation imparted by the sensor element is much larger than any frequency modulation created along the cabling. The FM signal detected at the receiver electronics is substantially unaffected by the small phase modulations occurring along the fiber. FM sensor designs are also essentially immune to amplitude modulation along the cabling, since the receiver electronics is only measuring a frequency shift. The current invention uses FM for signal transport from the sensor element to receiver electronics.

The present invention provides a microchip laser geophone to enable a cost effective, performance-competitive sensor technology with single fiber connections between sensor pods, low sensor weight and reduced size which represents a unique opportunity to provide a system that provides new capabilities in the oil and gas exploration industry.

An optical geophone for detecting seismic vibrational energy comprising a laser material which generates a lasing frequency signal, the frequency of which varies in accordance with vibrational energy incident upon the laser material, a light source occurring at an excitation frequency for providing excitation energy incident upon the laser material, so that the laser material emits light at the lasing frequency modulated by the vibrational energy and a fiber optic cable for transmitting the excitation frequency light to the laser material and receiving the frequency modulated lasing frequency for transmission to the receiver. The laser material comprises a first face and a second face, the first face being parallel to the second face. The first face is coated so that it reflects almost all (e.g. 99% reflectance) of the lasing frequency light and passes substantially all (e.g. 90% transmittance) of the excitation frequency light. The second face is coated so that the second face reflects substantially all (e.g. 99.9% reflectance) of the lasing frequency light and substantially all (e.g. 99.9% reflectance) of the excitation frequency light.

The optical geophone further comprises an acoustic amplifier for coupling vibrational energy to the laser material, wherein the vibrational energy is incident upon a side of the laser material orthogonal to the incidence of the excitation energy. The laser material comprises, for example, a solid monolith of single crystal lasing material such as Nd:YAG. The laser material is polished to precise tolerances on two opposing faces, wherein the first face is coated with a dielectric mirror which provides 99%–99.9% reflectance at the lasing wavelength of the laser material, and passes almost all of the optical pump wavelength used to excite the laser (for Nd:YAG, this is at 808 nm); and the second face is coated with a dielectric mirror that is highly reflective at both the pump wavelength and the lasing wavelength. The excitation light source comprises an optical beam at 808 nm, the Nd ions absorb this energy and fluoresce at 1064 nm whereby the reflective surfaces of face one and face two form an optical cavity that provides sufficient feedback to cause lasing at 1064 run. The output beam is coupled through the first face mirror and travels antiparallel to the direction of the excitation light source, wherein the excitation light source is supplied by an optical fiber, such that the lasing beam is being coupled back into the optical fiber, so that the system is essentially self-aligning. The laser material is capable of lasing on a plurality of longitudinal and transverse optical modes simultaneously, however, the laser crystal thickness is selected to be small enough so that the laser lases in a single mode.

DESCRIPTION OF A PREFERRED EMBODIMENT

The present invention provides an active optical element in a sensor pod, which provides significant common mode noise immunity through the use of a self heterodyning FM modulation technique. The apparatus of the present invention provides a microchip laser as a sensing element. A microchip laser, shown in FIG. 1, consists of a solid monolith of single crystal lasing material 100 such as Nd:YAG (Neodymium doped Yttrium Aluminum Garnet) polished to precise tolerances on two opposing faces. A first face 102 is coated with a dielectric mirror which provides 99%–99.9% reflectance at the lasing wavelength (1064 nm for the case of Nd:YAG), and passes almost all of the optical pump wavelength used to excite the laser (for Nd:YAG, this is at 808 mu). A second face 101 is coated with a high reflector at both the pump wavelength and the lasing wavelength. When an optical beam at 808 nm is focused down to a 50–100 $\mu$m diameter spot in the crystal, the Nd ions absorb this energy and fluoresce at 1064 nm. The mirrors form an optical cavity that provides sufficient feedback to cause lasing at 1064 nm. The output beam is coupled through the 99% reflecting mirror and travels antiparallel to the direction of the pump beam. If the pump beam is supplied by an optical fiber, then the lasing beam will be automatically coupled back into the optical fiber, thus the system is essentially self-aligning.

Figure 2:
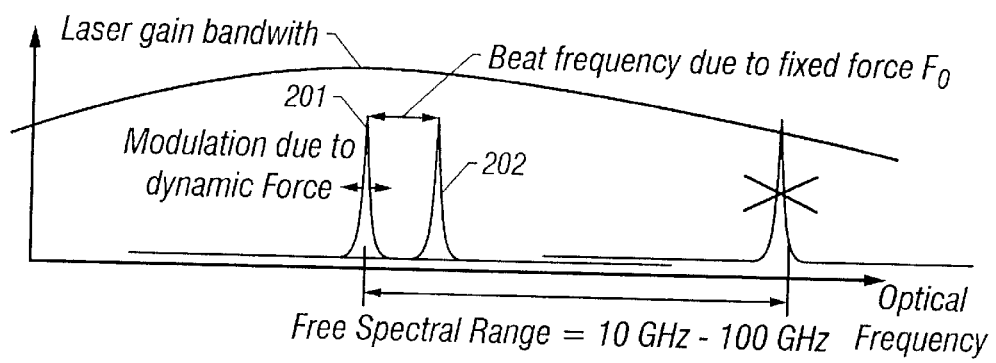
FIG. 2 is an illustration of the frequency spectrum of a preferred microchip laser.

In general, the laser material will lase on a plurality of longitudinal and transverse optical modes simultaneously. However, the lase crystal thickness is selected to be small enough, preferably less than 0.6 mm and the polished surfaces are highly parallel, so that the laser material lases only in a single mode. Single mode lasing occurs due to the frequency spacing between lasing modes, that is, the Free Spectral Range or FSR, is inversely dependent on the cavity length. The lasing mode at the right end of the graph of FIG. 2 is not allowed to lase because the gain bandwidth of the gain medium is not sufficiently wide enough to support such widely spaced modes. When the crystal manifests optical birefringence, the laser lases in two orthogonally polarized modes having different lasing frequencies or wavelengths. If this birefringence is small (the preferred YAG is an isotropic material with ideally zero birefringence), then the difference frequency between these two modes can be less than 1 MHz. As shown in FIG. 2, the two modes 201 and 202 represent the two polarization modes for the laser material.

The beat frequency between these two modes or frequencies can be measured by placing a linear polarizer oriented at 45 degrees to one of the polarization axes of the output laser beam. The resulting intensity modulated signal represents the difference frequency between the two polarization modes. In order to detect this beat frequency, the lasing modes should be sufficiently narrow, which has been experimentally verified by Zayhowski and others. The microchip laser linewidth is typically less than 10 kHz where free running, and can be less than 0.1 Hz with active stabilization. These measurements are made on a carrier wave having a frequency of 282 THz (for 1064-nm wavelength light). The 10 kHz linewidth represents an optical Q of greater than $10^{10}$. Note that a state of the art passive resonator can achieve optical Q values of 100,000. The preferred active laser actually provides a tremendous narrowing of the laser linewidth through positive feedback inside the laser cavity. This increase in the optical Q of an active cavity versus a passive cavity is a major reason an active optical cavity is capable of achieving extremely high sensitivities when used as an optical sensor.

The microchip laser of the present invention exhibits a number of other desirable features. First, the preferred microchip laser is very power efficient. The preferred microchip laser design provides an optical pump threshold of less than mW, an optical conversion efficiency of 25%, and a low manufacturing cost in large quantities. In fact, microchip lasers are now used in many solid state laser pointers that generate green or blue optical beams. Many different optical laser gain media can be utilized, and the sophisticated processes, although challenging, are now available from several commercial optics supply houses for manufacturing laser gain media (e.g., Casix Optics, China; VLOC, Florida).

Figure 1:
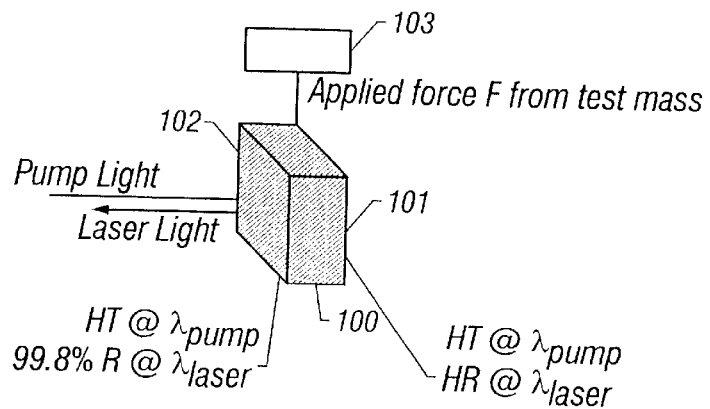
FIG. 1 is a simplified schematic drawing of a preferred embodiment of the present invention.

In a preferred embodiment, the microchip laser has a force applied 103 transverse to the beam axis as shown in FIG. 1. This transverse force 103 causes optical birefringence in the crystal through the photo-elastic effect. The resulting birefringence causes the beat frequency for the two polarization modes to change. The beat frequency is frequency modulated by the applied force. Holzapfel and Finneman (Finneman, Optics Letters 18, 23 (Dec. 1, 1993), pp. 2062–2064) showed a beat frequency stability of 3 Hz over a 1 minute integration time, a dynamic range of 140 dB, a sensitivity of 10 kHz/gram to 1 MHz/gram of weight applied, and minimal hysteresis and non-linearity. The frequency shift was highly stable and repeatable over a range of 10 Hz to 100 MHz. The pump laser intensity would likely have affected the beat frequency. However, in the Holzapfel paper, changes in the pump intensity of +/−2.5% caused no change in the beat frequency. Dynamic response was reported to b sub-millisecond. However, in principle the frequency response is sub-nanosecond and is determined by the optical path length in the laser cavity. In fact, the inventor has used microchip lasers to detect ultrasound waves at 10 MHz.

The present invention provides a microchip laser that is ideally suited for measuring applied forces with an immense dynamic range and excellent stability. Further, the optical signal is frequency modulated, thus making the return signal immune to electromagnetic interference but also to intensity modulation imparted by vibrations along the telemetry fiber or optical power losses along the fiber.

Figure 3:
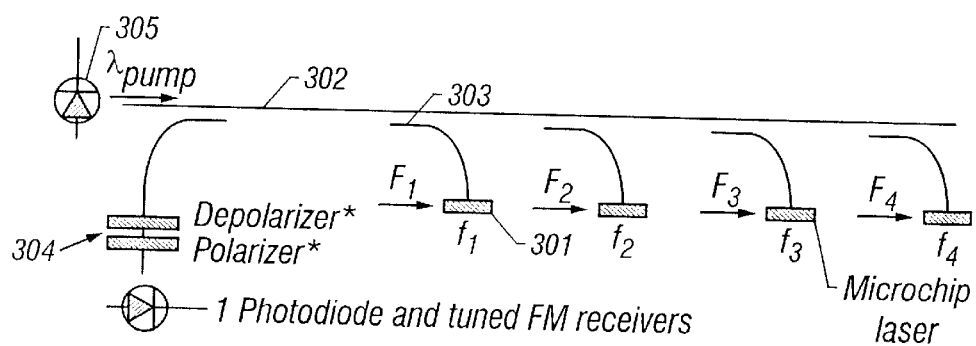
FIG. 3 illustrates frequency multiplexing of multiple optical sensors on one fiber.

FIG. 3 illustrates a preferred apparatus for multiplexing a number of microchip laser sensors 301 along a single fiber 302. A sensor pod consists of a microchip laser coupled to an optical fiber coupler 303. The coupler may have a coupling ratio of 1–99%, depending on the number of sensors placed on a single fiber. Light from a pump laser diode at 808 nm is coupled into the fiber at the left end of the system. The pump light is coupled into each sensor pod and absorbed at each microchip laser. The lasing output of each sensor element is weakly coupled back onto the fiber, where it is eventually coupled off the fiber with a wavelength-selective fiber coupler, passes through a polarizer/depolarizer 304 combination and is detected. The polarizer can be placed in each sensor pod if desired.

In order to ensure that each sensor signal can be separated for detection in the electronics, the microchip laser in each sensor pod has a fixed bias stress applied. This fixed bias can be adjusted through a screw or it can be set at the factory. Another method to set the bias is to use a birefringent laser crystal such as Nd:YVO$_4$.

Yttrium Vanadate provides better lasing properties; also it is slightly softer and therefore more sensitive to applied forces, and its birefringence is direction-dependent. This means that a particular crystal orientation during manufacturing will create a unique frequency bias, even with no force applied. This latter approach is preferable and may be more stable than using a bias stress.

The bias frequencies for the sensors along a fiber are selected so that the maximum FM modulation from dynamic vibrations does not exceed half of the frequency gap between sensor pods. This restriction should include the possible misalignment of the pod with Earth's gravitational field, as the misalignment also creates a beat frequency bias. Beat frequency bias may also be used to advantage, since the angle of the sensor can be measured directly by measuring the beat frequency.

The output of the photodetector has a frequency spectrum containing broadcast stations for each sensor pod, each of which is frequency modulated by the dynamic accelerations or velocities experienced by the sensor. Conventional, low cost FM receiver electronics are used to convert each frequency shift into a voltage output, or the signal, which is directly digitized and stored in a data acquisition system. The latter choice circumvents significant SNR degradation during the D/A and A/D conversions and permits the use of sophisticated spectral analysis software to extract the individual sensor signals with excellent fidelity.

In essence, the design digitizes the information at the sensor pod in the form of a frequency and it remains in digital form thereafter. In this case, the analog support electronics is straightforward. A system with 20 sensors along a single fiber is selected as an example for power requirement calculations. The couplers have a geometrically increasing coupling ratio, with the first coupler having a 5% coupling ratio. A typical coupling ratio profile would be:

0.05, 0.05, 0.06, 0.06, 0.06, 0.07, 0.07, 0.08, 0.08, 0.09, 0.10, 0.11, 0.12, 0.15, 0.17, 0.20, 0.25, 0.34, 0.50

Utilizing this approach, each pod experiences the same loss between itself and the receiver photodiode. To achieve 16-bit resolution at a 1 kHz bandwidth for each sensor pod, the shot noise limited optical power requirement is 5 uW. These assumptions yield a total detected power of 100:W at the photodiode. The sensor most distant from the photodiode experiences the greatest optical loss. Note that fiber cabling typically experiences losses of 0.3–0.7 dB/km at 1064 nm wavelength, depending on whether single mode or multi-mode fiber is utilized. Thus, cabling does not present a significant signal loss mechanism in this design. All of the sensor signals pass through the first coupler, which is a wavelength dependent coupler and experiences negligible loss for the 1064 nm signals. The most remotely located sensor pod signal passes through 19 couplers, generating a total loss of 0.05 or 13 dB. Connectors utilized in the system generate an additional 8 dB loss (40 connectors at 0.2 dB/connector). The last sensor pod has no coupler, so no pod coupler loss is present. The total loss between the photodiode and the most remotely located microchip laser is then 21 dB, giving a required microchip laser output power of 0.6 mW.

To achieve a 0.6 mW level of output power, each microchip laser is pumped with approximately 5 mW of optical power at 808 nm. Since the couplers are weighted to provide equal coupling of pump power to each pod, the required pump power is 5 mW×20 pods=100 mW total. This 100 mW required power can easily be achieved using an inexpensive laser diode. Note that for a 100 mW pump input, the detected optical signal total is 100 $\mu$W, giving an optical system efficiency of 0.10%. This system makes somewhat inefficient use of optical power, however, it has a very simple detection system.

Also note with this design, star and ring topologies are possible. Multiple microchip sensors can also be placed in a single pod using 1×3 or 1×4 couplers to give two or three axes of data in each pod. The only requirement to ensure selectivity of individual sensors is the need for a distinguishable, unique beat frequency for each sensor.

The microchip laser of the present invention responds to an applied force. An acoustic amplifier 103 is provided to convert acceleration or hydrostatic pressure into a unidirectional force. In a preferred embodiment, a low frequency cutoff in the response is provided that occurs at or below 10 Hz. This requires a test mass and spring constant that satisfy the mechanical resonant frequency upper limit of 10 Hz. For a 100 gram test mass, this corresponds to a spring constant of $k=(2\pi f)^2 M < 400$ N/m. This is easily achieved with available spring designs.

The test mass of 100 grams generates a force of $F=Ma$, where a is the applied acceleration due to vibrations. For a sensitivity of 1 $\mu g$'s=10 $\mu$m/sec$^2$, the resulting force is F=1 $\mu$N. A sensitivity factor of 100 MHz/N has been previously demonstrated. It is reasonable to expect this value to increase by a factor of 10 through mechanical advantage design of the microchip laser, giving a sensitivity of S=1000 MHz/N. A 1 $\mu$N force will result in a frequency shift of 1 kHz.

The noise floor for the reported optical system is 3 Hz over a 60-second interval. Extrapolating this to a 1 kHz bandwidth and assuming gaussian noise, the noise floor increases to 750 Hz. A preferred embodiment achieves state of the art detection sensitivities in an array of at least 20 sensors connected to a single optical fiber. Note that the noise floor is proportional to the square root of the bandwidth desired. The noise floor improves at lower bandwidth signals. Assuming a system with 20 sensor pods and 25 meters between pods, the total system cost, including data acquisition, is relatively inexpensive.

In an alternative embodiment, a vertical cavity surface emitting laser (VCSEL) is provided having an acoustic amplifier coupling vibrational energy parallel or orthogonal to the vertical cavity and the incidence angle of the excitation energy light source. A VCSEL is a very efficient laser structure, well known in the art, which consists of two dielectric mirrors with high reflectances (typically 99%–99.9% reflectance) between which is placed one or more thin quantum well optical gain layers. The optical gain layers can be electrically or optically pumped, resulting in laser operation with low energy thresholds and output powers of up to 10 mW, along with efficiencies of greater than 35%. Since the cavity lengths are short, VCSEL's usually operate in a single longitudinal mode and one or more transverse modes. The output can be unpolarized or polarized, depending on the VCSEL structure's detailed design.

In the absence of vibrational energy, the VCSEL used here is designed to have birefringence in the optical cavity, which results in laser operation of two orthogonally polarized modes at two different frequencies. The vibrational energy causes compression and rarefaction of the optical cavity, which creates additional optical birefringence in the optical cavity. The additional birefringence modulates the frequency difference between the two laser modes of the VCSEL. Since a VCSEL is constructed using precision, well-established photolithographic techniques, the intrinsic birefringence in the VCSEL can be accurately engineered.

The thickness of a VCSEL structure is usually very thin less than 20 $\mu$m, resulting in a very large free spectral range (FSR=c/(2Ln), where c is the speed of light in vacuum, L is the cavity length and n is the refractive index of the cavity material). The FM modulation depth is given by $\Delta v/v = \Delta L/L$, where $\Delta v$ is the frequency modulation resulting from an optical cavity length change $\Delta L$ (which has contributions from the physical length change and the refractive index change caused by the photo-elastic effect) induced by vibrations or pressure changes. The reduced cavity length L of the VCSEL compared with a microchip laser (typically>200 $\mu$m) results in a larger FM modulation depth for a fixed length change $\Delta L$. The increased FM modulation depth is offset to some degree by the increased linewidth of VCSEL's greater than 1 MHz typically compared with microchip lasers less than 10 kHz typically. However, for some applications the VCSEL can provide cost or packaging advantages over a microchip laser based sensor.

What is claimed is:

1. An optical apparatus for detecting seismic vibrational energy comprising:
   a fixed length cavity laser material exhibiting birefringence which generates two orthogonal lasing frequency signals lasing at different frequencies, a beat frequency between the two frequencies which varies in accordance with vibrational energy incident upon the laser material, wherein the vibrational energy is incident upon a side of the laser material orthogonal to the incidence of excitation energy, wherein the vibrational energy stresses the laser material;
   a light source occurring at an excitation frequency for providing the excitation energy incident upon the laser material, so that the laser material emits light at the beat frequency modulated by the vibrational energy; and
   a fiber optic cable for transmitting the excitation frequency light to the laser material and receive the frequency modulated lasing frequency for transmission to a receiver.

2. The optical apparatus of claim 1, wherein the laser material further comprises: a first face and a second face, the first face being parallel to the second face wherein the first face is coated so that the first face passes substantially all of the lasing frequency light and reflects substantially all of the excitation frequency light, wherein the second face is coated so that the second face reflects substantially all of the lasing frequency light and substantially all of the excitation frequency light.

3. The optical apparatus of claim 1, further comprising: an acoustic amplifier for coupling vibrational energy to the laser material.

4. The optical apparatus of claim 1, wherein the laser material is polished to precise tolerances on two opposing faces.

5. The optical apparatus of claim 1, wherein the laser material has a selected beat frequency bias to determine the angle of the laser material with respect to the Earth's gravitational field.

6. The optical apparatus of claim 2, wherein the first face is coated with a dielectric mirror which provides 99%–99.9% reflectance at the lasing wavelength of the laser material, and passes almost all of the optical pump wavelength used to excite the laser (for Nd:YAG, this is at 808 nm); and the second face is coated with a highly reflective mirror at both the pump wavelength and the lasing wavelength.

7. The optical apparatus of claim 2, wherein the excitation light source comprises an optical beam at 808 nm, the laser material absorbs this energy and fluoresces at 1064 nm whereby the reflective surfaces of face one and face two form an optical cavity that provides sufficient feedback to cause lasing at 1064 nm.

8. The optical apparatus of claim 1, further comprising multiple optical apparatuses placed in a single pod to give multiple axes of data in the single pod.

9. The optical apparatus of claim 1, wherein an output beam is coupled through a substantially reflecting mirror and travels antiparallel to the direction of the excitation light source, wherein the excitation light source is supplied by an optical fiber, such that the lasing beam is coupled back into the optical fiber, so that the system is essentially self-aligning.

10. The optical apparatus of claim 1, wherein the laser material thickness is selected to be small enough so that the laser lases in a single longitudinal mode.

11. The optical apparatus of claim 1, wherein the laser material thickness is selected to be small enough so that the laser lases in a single longitudinal mode.

12. The optical apparatus of claim 1 wherein the laser material comprises a vertical cavity surface emitting laser (VCSEL) wherein the VCSEL first mirror is substantially transparent to the optical pump wavelength and almost completely reflecting at the lasing wavelength (e.g. 99% reflecting at the lasing wavelength); and the second mirror is substantially 100% reflecting at the pump wavelength and the lasing wavelength.

13. The optical apparatus of claim 1, wherein the laser material comprises a solid monolith such as Yttrium vanadate having a direction-dependent birefringence.

14. The optical apparatus of claim 1, wherein the laser material has a particular crystal orientation created during manufacture to create a unique frequency bias.

15. An optical method for detecting seismic vibrational energy comprising the steps of:

holding a cavity length fixed in a laser material exhibiting birefringence, which generates two orthogonal lasing frequency signals at different frequencies when excited by excitation energy;

generating a beat frequency between the two frequencies which varies in accordance with vibrational energy incident upon the laser material, wherein the vibrational energy is incident upon a side of the laser material orthogonal to the incidence of the excitation energy;

providing a light source occurring at an excitation frequency for providing excitation energy incident upon the laser material, so that the laser material emits light at the beat frequency modulated by the vibrational energy; and transmitting over a fiber optic cable the excitation frequency light to the laser material and receiving the frequency modulated lasing frequency for transmission to a receiver.

16. The optical method of claim 15, wherein the laser material further comprises: a first face and a second face, the first face being parallel to the second face, wherein the first face is coated so that the first face passes substantially all of the lasing frequency light and reflects substantially all of the excitation frequency light, wherein the second face is coated so that the second face reflects substantially all of the lasing frequency light and substantially all of the excitation frequency light.

17. The method of claim 15, further comprising: coupling vibrational energy from the laser material via an acoustic amplifier.

18. The optical method of claim 15, wherein the laser material comprises a solid monolith of lasing material such as Nd:YAG.

19. The method of claim 15, further comprising:
determining an angle of the laser material with respect to the Earth's gravitational field by detecting a selected beat frequency for the laser material.

20. The method of claim 16, wherein the first face is coated with a dielectric mirror which provides 99%–99.9% reflectance at the lasing wavelength of the laser material, and passes almost all of the optical pump wavelength used to excite the laser (for Nd:YAG, this is at 808 nm); and the second face is coated with a highly reflective mirror at both the pump wavelength and the lasing wavelength.

21. The method of claim 16, wherein the excitation light source comprises an optical beam at 808 nm, the laser material absorbs this energy and fluoresces at 1064 nm whereby the reflective surfaces of face one and face two form an optical cavity that provides sufficient feedback to cause lasing at 1064 nm.

22. The method of claim 15, further comprising:
placing multiple optical apparatuses in a single pod; and generating multiple axes of data in the single pod.

23. The optical method of claim 15, wherein the laser material lases on a plurality of longitudinal and transverse optical modes simultaneously.

24. The method of claim 15, further comprising:
sensing a direction-dependent birefringence in the laser material comprising a solid monolith such as Yttrium vanadate.

25. The method of claim 15, further comprising:
creating a particular crystal orientation in the laser material during manufacture to create a unique frequency bias.

26. The method of claim 15, further comprising:
sensing a selected beat frequency bias to determine the angle of the laser material with respect to the Earth's gravitational field.

27. The optical method of claim 15, wherein an output beam is coupled through a substantially reflecting mirror and travels antiparallel to the direction of the excitation light source, wherein the excitation light source is supplied by an optical fiber, such that the lasing beam is coupled back into the optical fiber, so that the system is essentially self-aligning.

28. The optical method of claim 15, further comprising:
selecting the laser material thickness is selected to be small enough so that the laser lases in a single longitudinal mode.

* * * * *